US012513087B2

(12) United States Patent
Collins et al.

(10) Patent No.: US 12,513,087 B2
(45) Date of Patent: Dec. 30, 2025

(54) OPTIMIZING DATA TRANSMISSION IN LOCATION-AWARE SYSTEMS

(71) Applicant: NVIDIA CORPORATION, Santa Clara, CA (US)

(72) Inventors: Galen Collins, Seattle, WA (US); Michael Stanton Kron, Redmond, WA (US); Derik Schroeter, Newark, CA (US); Matthew Sammis Ashman, Redmond, WA (US); Vladimir Shestak, Boulder, CO (US)

(73) Assignee: NVIDIA CORPORATION, Santa Clara, CA (US)

( * ) Notice: Subject to any disclaimer, the term of this patent is extended or adjusted under 35 U.S.C. 154(b) by 21 days.

(21) Appl. No.: 18/430,500

(22) Filed: Feb. 1, 2024

(65) Prior Publication Data

US 2025/0254126 A1    Aug. 7, 2025

(51) Int. Cl.
*G06F 15/16* (2006.01)
*G08G 1/09* (2006.01)
*H04L 47/2425* (2022.01)

(52) U.S. Cl.
CPC ......... *H04L 47/2425* (2013.01); *G08G 1/094* (2013.01)

(58) Field of Classification Search
CPC ............................ H04L 47/2425; G08G 1/094
See application file for complete search history.

(56) References Cited

U.S. PATENT DOCUMENTS

| 8,140,358 | B1 * | 3/2012 | Ling | G07C 5/008 |
| | | | | 340/439 |
| 11,989,019 | B1 * | 5/2024 | Krishnaswamy | B60W 60/00 |
| 2007/0005609 | A1 * | 1/2007 | Breed | G01S 17/86 |
| 2010/0235030 | A1 * | 9/2010 | Xue | B60L 50/16 |
| | | | | 180/65.21 |
| 2014/0120842 | A1 * | 5/2014 | Helm | H04W 4/50 |
| | | | | 455/67.7 |
| 2017/0025000 | A1 * | 1/2017 | Lagassey | G08G 1/04 |
| 2018/0139258 | A1 * | 5/2018 | Margolin | H04N 21/6582 |

(Continued)

OTHER PUBLICATIONS

"S2 Cells S2 Geometry", https://s2geometry.io/devguide/s2cell_hierarchy, Dec. 27, 2023, 27 pages.

(Continued)

*Primary Examiner* — Razu A Miah
(74) *Attorney, Agent, or Firm* — Squire Patton Boggs LLP; Sarah Mirza

(57) ABSTRACT

In various examples, a technique for managing data uploads from location-aware systems includes determining a set of attributes associated with a set of data uploaded using a set of location-aware systems in a geographic region. The technique also includes computing a set of upload control parameters for the geographic region based at least on the set of attributes. The technique further includes receiving, from a location-aware system, a request indicating the geographic region. The technique additionally includes sending, to the location-aware system in response to the request, the set of upload control parameters within one or more control layers included in map data for the geographic region, wherein the location-aware system controls upload of additional data associated with the geographic region based at least on the one or more control layers.

20 Claims, 11 Drawing Sheets

(56) References Cited

U.S. PATENT DOCUMENTS

2018/0293809 A1* 10/2018 James .................... H04W 4/38
2022/0309844 A1* 9/2022 Linsmeier .............. A62C 27/00
2024/0004715 A1* 1/2024 Bai ....................... G06F 9/5072

OTHER PUBLICATIONS

"Geographic coordinate system", https://en.wikipedia.org/wiki/Geographic_coordinate_system, Dec. 27, 2023, 6 pages.
"HERE Map Tile API—Developer Guide", https://www.here.com/docs/bundle/map-tile-developer-guide/page/topics/mercator-projection.html, Dec. 28, 2023, 5 pages.
"H3: Uber's Hexagonal Hierarchical Spatial Index", https://www.uber.com/blog/h3/, Jun. 27, 2018, 14 pages.

* cited by examiner

224

302 {
```
enum SSRTriggerCondition : byte {

None = 0,
    Partial,
    All

}
```

304 {
```
table SSRControlsV1Layer { values: [SSRTriggerCondition];
    zoom_level: uint8;

```
                   ╭ table MapstreamControlsV1Layer {
                   │
           306 ─┤    pvalues: [uint8];
                   │   zoom_level: uint8;
                   │
                   ╰ }
```

OPTIMIZING DATA TRANSMISSION IN LOCATION-AWARE SYSTEMS

BACKGROUND

Modern vehicles are commonly equipped with sensors and communication systems that collect and transmit data related to their surroundings. This data may include (but is not limited to) images, point clouds, road conditions, traffic patterns, weather conditions, and/or other information that can be used to evaluate and/or improve vehicle operation and navigation. For example, a fleet of autonomous or semi-autonomous vehicles or other machine types within a geographic or other physical area may continuously collect and transmit data to a central server. This data may be used to debug issues in the vehicles, train machine learning models used in the operation of the vehicles, and/or perform other tasks.

However, the volume of data collected by a large fleet of vehicles can quickly exceed a limited bandwidth allocation for transmitting data from the fleet. When this bandwidth allocation is exceeded, additional data transmissions may be throttled or cut off. Additionally, the value or importance of a given set of collected data may vary depending on factors such as (but not limited to) the geographic location of the corresponding vehicle, the type of the collected data, use cases associated with the collected data, and/or duplication of the collected data in other vehicles. Consequently, selective transmission of data from vehicles in the fleet may be required to use available network bandwidth and/or other limited resources in an efficient and effective manner.

Existing approaches to controlling data transmission from fleets of vehicles include a distributed configuration system that sends instructions for uploading various types and quantities of data to the vehicles via a push or pull mechanism. These existing approaches may also, or instead, involve evaluating data uploaded by the vehicles and sending messages to throttle additional uploads from the vehicles. However, these existing approaches entail frequent communication with the vehicles, which requires a resource-intensive online infrastructure that may be difficult to maintain and/or scale. These existing approaches may further involve the creation and definition of individual "campaigns" that represent different configurations or policies for uploading data from the vehicles. Each campaign may additionally require the creation and/or propagation of custom code, retry mechanisms, redundancies, databases, and/or caching layers to implement the campaign, which is both time- and resource-intensive.

As such, a need exists for more effective techniques for managing data transmission in large-scale vehicle fleets.

SUMMARY

Embodiments of the present disclosure relate to optimizing data transmission in location-aware systems. The techniques described herein include determining a set of attributes associated with a set of data uploaded using a set of location-aware systems in a geographic region. The technique also includes computing a set of upload control parameters for the geographic region based at least on the set of attributes. The technique further includes receiving, from a location-aware system, a request indicating the geographic region. The technique additionally includes sending, to the location-aware system in response to the request, the set of upload control parameters within one or more control layers included in map data for the geographic region, wherein the location-aware system controls upload of additional data associated with the geographic region based at least on the one or more control layers.

One technical advantage of the disclosed techniques relative to prior approaches is the ability to specify and implement various policies for controlling the upload of data from a fleet of vehicles, thereby allowing limited bandwidth allocated to these uploads to be used in an efficient, effective, and responsive manner. Additionally, the disclosed techniques allow portions of control layers for controlling data uploads to be selectively requested by the vehicles, which reduces communication with the vehicles and resource overhead associated with an online infrastructure for conducting this communication. Further, because schemas for the control layers are distributed with the control layers, the vehicles are able to adapt data uploads to parameters in the control layers without requiring custom code, retry mechanisms, redundancies, databases, and/or caching layers to be created and propagated.

BRIEF DESCRIPTION OF THE DRAWINGS

The present systems and methods for optimizing data transmission in location-aware systems are described in detail below with reference to the attached drawing figures, wherein:

FIG. 3A illustrates an example schema for a control layer that is used to control data uploads from a set of location-aware systems, according to various embodiments;

FIG. 3B illustrates an example schema for a control layer that is used to control data uploads from a set of location-aware systems, according to various embodiments;

DETAILED DESCRIPTION

Figure 1:
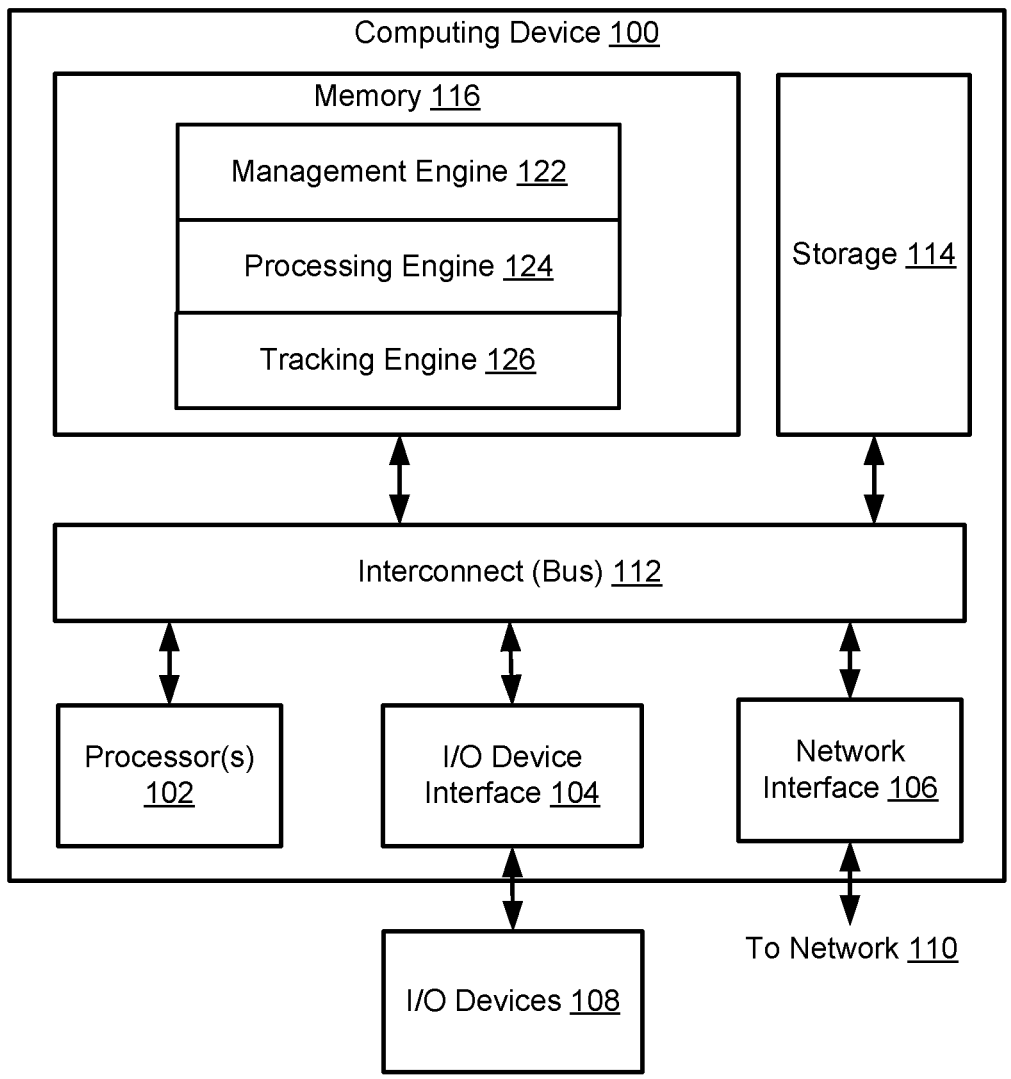
FIG. 1 illustrates a computing device configured to implement one or more aspects of various embodiments.

Systems and methods are disclosed related to optimizing data transmission in autonomous and semi-autonomous systems and applications. Although the present disclosure may be described with respect to an example autonomous or semi-autonomous vehicle or machine 500 (alternatively referred to herein as "vehicle 500," "ego-vehicle 500," "machine 500," or "ego-machine 500," an example of which is described with respect to FIGS. 5A-5D), this is not intended to be limiting. For example, the systems and methods described herein may be used by, without limitation, location-aware systems that are capable of detecting, computing, and/or using the geographical position of a person, a mobile device, and/or a moving object. These location-aware systems may be included in and/or used in conjunction with non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to data transmission by autonomous or semi-autonomous machines and applications, this is not intended to be limiting, and the systems and methods described herein may be used in augmented reality, virtual reality, mixed reality, robotics, security and surveillance, autonomous or semi-autonomous machine applications, mobile devices, and/or any other technology spaces where management of data transmission may be used.

As discussed herein, the volume of data collected by a large fleet of vehicles can quickly exceed a limited bandwidth allocation for transmitting data from the fleet. When this bandwidth allocation is exceeded, additional data transmissions may be throttled or cut off. Additionally, the value or importance of a given set of collected data may vary depending on factors such as (but not limited to) the geographic location of the corresponding vehicle, the type of the collected data, use cases associated with the collected data, and/or duplication of the collected data in other vehicles.

To improve data transmission in vehicle fleets and/or other location-aware systems with limited bandwidth, the disclosed techniques provide guidance related to uploading data from vehicles in a fleet via a set of geospatially indexed control layers. A vehicle may request one or more control layers from a server and/or a centralized distribution system and selectively upload data according to information in the control layer(s). Each control layer may specify, for a given geographic region, the types of data that can be uploaded, the amount of data to be uploaded, the frequency with which the data is to be uploaded, the number of times the data should be uploaded, situations in which data should be uploaded or not uploaded, times at which the data should be uploaded or not uploaded, probabilities or priorities associated with uploading these types of data, settings for enabling or disabling the upload of data, and/or other parameters that can be used to control the upload of data from that geographic region. A given control layer may be added, removed, and/or updated in real-time or near-real-time to reflect new use cases and/or changes to existing use cases associated with the uploaded data, the types and amount of data that has already been uploaded for the geographic region, and/or other factors. A given control layer may also be distributed with a schema that allows a vehicle to interpret and adapt data uploads to parameters in the control layer.

One technical advantage of the disclosed techniques relative to prior approaches is the ability to specify and implement various policies for controlling the upload of data from a fleet of vehicles, thereby allowing limited bandwidth allocated to these uploads to be used in an efficient, effective, and responsive manner. Additionally, the disclosed techniques allow portions of control layers for controlling data uploads to be selectively requested by the vehicles, which reduces communication with the vehicles and resource overhead associated with an online infrastructure for conducting this communication. Further, because schemas for the control layers are distributed with the control layers, the vehicles are able to adapt data uploads to parameters in the control layers without requiring custom code, retry mechanisms, redundancies, databases, and/or caching layers to be created and propagated.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system(s) on a chip(s), an in-vehicle computing device, and/or any other type of computing device configured to receive input, process data, and optionally display images, and is suitable for practicing one or more embodiments. Computing device 100 is configured to run a management engine 122, a processing engine 124, and a tracking engine 126 that may reside in a memory 116. It is noted that the computing device described herein is illustrative and that any other technically feasible configurations fall within the scope of the present disclosure. For example, multiple instances of management engine 122, processing engine 124, and tracking engine 126 may execute on a set of nodes in a distributed and/or cloud computing system to implement the functionality of computing device 100.

In one or more embodiments, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a parallel processing unit (PPU), a data processing unit (DPU), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center) and/or may correspond to a virtual computing instance executing within a computing cloud.

In at least one embodiment, I/O devices 108 include devices capable of receiving input, such as a keyboard, a mouse, a touch screen, a touchpad, a VR/MR/AR headset, a gesture recognition system, and/or a microphone, as well as devices capable of providing output, such as a display device(s), a haptic device(s), and/or a speaker(s). Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, a cellular network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Management engine 122, processing engine 124, and tracking engine 126 may be stored in storage 114 and loaded into memory 116 when executed.

In one or more embodiments, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs that can be executed by processor(s) 102 and application data associated with said software programs, including management engine 122, processing engine 124, and tracking engine 126.

Management engine 122, processing engine 124, and tracking engine 126 include functionality to manage the upload of data from a group of location-aware systems. For example, management engine 122, processing engine 124, and tracking engine 126 may be used to control the upload of images, point clouds, sensor data, telemetry data, event data, user interaction data, and/or other types of data from a fleet of vehicles. This may allow the data uploads to efficiently utilize limited bandwidth allocated to the fleet, reduce duplication of uploaded data, scale with the number of vehicles in the fleet, efficiently propagate changes to data upload controls and/or policies to the fleet, and/or increase the quality and/or diversity of data uploaded by the vehicles. The operation of management engine 122, processing engine 124, and tracking engine 126 is described in further detail below.

Figure 2:
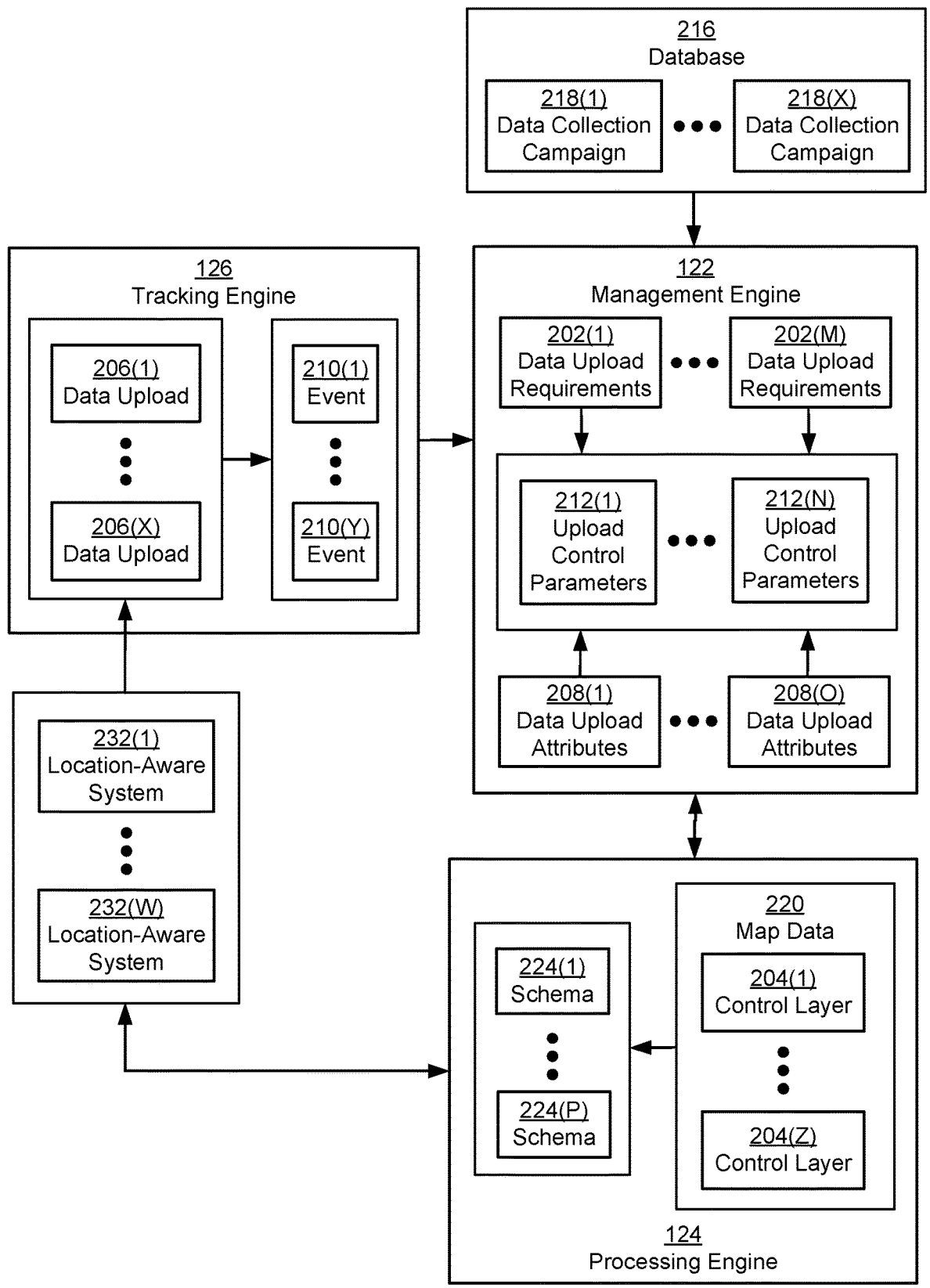
FIG. 2 is a more detailed illustration of the management engine, processing engine, and tracking engine of FIG. 1, according to various embodiments.

FIG. 2 is a more detailed illustration of management engine 122, processing engine 124, and tracking engine 126 of FIG. 1, according to various embodiments. As mentioned herein, management engine 122, processing engine 124, and tracking engine 126 may be used to manage the upload of data from a set of location-aware systems 232(1)-232(W) (each of which is referred to individually herein as location-aware system 232). For example, management engine 122, processing engine 124, and tracking engine 126 may be used to increase and/or throttle the upload of data from a fleet of vehicles operating within one or more geographic regions.

Tracking engine 126 generates events 210(1)-210(Y) (each of which is referred to individually herein as event 210) that track data uploads 206(1)-206(X) (each of which is referred to individually herein as data upload 206) by location-aware systems 232. For example, tracking engine 126 may receive and/or detect data uploads 206 of images, point clouds, sensor data, telemetry data, event data, user interaction data, and/or other types of data from a fleet of vehicles. Tracking engine 126 may also generate a separate event 210 for each data upload 206 and publish that event 210 to one or more topics within a distributed messaging system.

Each event 210 generated from a corresponding data upload 206 may include metadata related to the data upload 206. For example, tracking engine 126 may populate a given event 210 representing a data upload 206 with data such as (but not limited to) a unique identifier for the event, a timestamp, an amount of data uploaded, one or more types of data included in that data upload 206, a location and/or geographic region from which the uploaded data was collected, a type of location-aware system 232 (e.g., a semi-autonomous vehicle, an autonomous vehicle, a mobile device, etc.) from which the data was uploaded, an identifier for that location-aware system 232, an identifier for a user associated with that location-aware system 232 (e.g., a mobile device user, a driver or passenger of a vehicle, etc.), hardware and/or software components used to collect the data, a time and/or bandwidth consumed by that data upload 206, and/or other contextual information associated with that data upload 206.

Tracking engine 126 may also generate and/or publish additional events 210 based on aggregations and/or analyses of events 210 representing individual data uploads 206. For example, tracking engine 126 may aggregate multiple events 210 representing individual data uploads 206 from a given geographic region, of a certain type of data, and/or over a certain time period into one or more events representing the count of these data uploads 206, the amount of data uploaded, the amount or proportion of allocated bandwidth consumed by these data uploads 206, and/or other metrics or statistics associated with these data uploads 206. Tracking engine 126 may also, or instead, perform additional aggregations of events 210 representing multiple data uploads 206 by individual location-aware systems 232, types of location-aware systems 232, and/or other dimensions.

Management engine 122 analyzes events 210 to determine one or more sets of data upload attributes 208(1)-208(O) (each of which is referred to individually herein as data upload attributes 208) associated with data uploads 206. In some embodiments, data upload attributes 208 include attributes of data uploads 206 that are pertinent to and/or that can be used to control subsequent data uploads 206 from location-aware systems 232. For example, a set of data upload attributes 208 may be computed for each data upload 206; a set of data uploads 206 from a given location-aware system 232, a group of location-aware systems 232, and/or a type of location-aware system 232; a set of data uploads 206 from a given geographic region and/or location; a set of data uploads 206 represented by one or more events 210; a given time period, and/or another selection and/or aggregation of data uploads 206. Data upload attributes 208 may include (but are not limited to) the number of data uploads 206 from a given geographic region, from one or more location-aware systems 232, and/or over a certain time period; an amount of data included in data uploads 206 from a geographic region, from one or more location-aware systems 232, and/or over a certain time period; one or more types of data (e.g., images, point clouds, road conditions, traffic patterns, weather conditions, lane geometries, traffic signs, traffic rules, etc.) included in data uploads 206 from a given geographic region, from one or more location-aware systems 232, and/or over a certain time period; and/or one or more characteristics of data (e.g., types of objects depicted in images and/or point clouds, situations and/or scenarios under which the data was collected, specific values in the data, etc.) included in data uploads 206 from a given geographic region, from one or more location-aware systems 232, and/or over a certain time period.

Management engine 122 also determines one or more sets of data upload requirements 202(1)-202(M) (each of which is referred to individually herein as data upload requirements 202) associated with location-aware systems 232. In some embodiments, data upload requirements 202 include constraints associated with data uploads 206 by location-aware systems 232. For example, each set of data upload requirements 202 may specify a given geographic region, a specific location-aware system 232 (e.g., a unique identifier for a vehicle), a type of location-aware system 232 (e.g., a category of location-aware system 232, one or more hardware and/or software components included in one or more location-aware systems 232, a model of location-aware system 232, a company and/or entity associated with manufacturing or operating one or more location-aware systems 232, etc.), a group of location-aware systems 232 (e.g., a specific fleet or subset of vehicles), a type of data included in data uploads 206 (e.g., sensor data, telemetry data, images, weather conditions, road conditions, traffic conditions, log data, synthetic/simulated data, real-world data, etc.), a characteristic of data included in data uploads 206, a time period over which data uploads 206 are to be collected, and/or another dimension associated with data uploads 206. Each set of data upload requirements 202 may also include (but are not limited to) a minimum, maximum, and/or desired number of data uploads 206 associated with a given set of dimensions; a minimum, maximum, and/or desired amount of data to be included in data uploads 206 associated with a given set of dimensions; and/or other value that can be used to control data uploads 206 associated with a given set of dimensions.

In some embodiments, management engine 122 derives a given set of data upload requirements 202 from one or more data collection campaigns 218(1)-218(X) (each of which is referred to individually herein as data collection campaign 218) stored in a database 216. Each data collection campaign 218 may represent a request by an entity (e.g., a user, team, organization, etc.) for data from one or more location-aware systems 232. For example, an entity may specify one or more data collection campaigns 218 via a user interface, application programming interface (API), and/or another type of interface with database 216. The entity may include, in each data collection campaign 218, one or more sets of coordinates, a map tile, a geofenced boundary, and/or another representation of a geographic location and/or region from which data is to be collected. The entity may also specify a certain number of data uploads 206, a certain amount of data to be uploaded, a type of data to be uploaded, a type of location-aware system 232 from which data is to be uploaded, a time period over which data is to be uploaded, one or more scenarios or conditions under which data is to be uploaded, and/or other attributes associated with the requested data. After creation of a given data collection campaign 218 is complete, that data collection campaign 218 may be stored in database 216 for subsequent retrieval and use by management engine 122 and/or other components.

To generate data upload requirements 202 from data collection campaigns 218, management engine 122 may group data collection campaigns 218 by geography, type of location-aware system 232, type of data, and/or other dimensions. For each group of data collection campaigns 218, management engine 122 may aggregate the number of data uploads 206, the amount of data to be uploaded, and/or other numeric values corresponding to requested quantities of data associated with the corresponding dimension(s). Management engine 122 may then populate a corresponding set of data upload requirements 202 with the dimensions and numeric values.

Management engine 122 compares data upload attributes 208 to data upload requirements 202 and uses results of the comparison to generate one or more sets of upload control parameters 212(1)-212(N) (each of which is referred to individually herein as upload control parameters 212). For example, management engine 122 may generate a new set of upload control parameters 212 for a given location, geographic region, location-aware system 232, type of location-aware system 232, group of location-aware systems, time period, and/or another dimension on a periodic (e.g., every time a certain number of seconds or minutes has elapsed) and/or on-demand (e.g., whenever a new data upload 206 associated with the dimension(s) is received) basis. To compute the new upload control parameters 212, management engine 122 may match locations, geographic regions, identifiers for location-aware systems 232, types of location-aware systems 232, timestamps, types of data, and/or other dimensions included in data upload attributes 208 of one or more data uploads 206 to corresponding dimensions included in one or more sets of data upload requirements 202. Management engine 122 may also use data upload attributes 208 to compare the amount of data, number of data uploads 206, and/or other quantities associated with data uploads 206 with the requested amount of data, number of data uploads 206, and/or other quantities requested in the corresponding data upload requirements 202. Management engine 122 may additionally compute one or more differences, ratios, proportions, and/or other statistics between the quantities of data uploads 206 and the corresponding requested quantities in data upload requirements 202. Management engine 122 may then convert the statistics into upload control parameters 212 that can be used to control subsequent data uploads 206 associated with the corresponding dimensions. For example, management engine 122 may compute upload control parameters 212 that can be used to adjust the rate of data uploads 206, frequency of data uploads 206, probabilities of data uploads 206, and/or amount of data included in individual data uploads 206 associated with a given set of dimensions based on one or more statistics computed between the quantities of existing data uploads 206 associated with the set of dimensions and the requested quantities of data for the same set of dimensions.

In one or more embodiments, upload control parameters 212 include rules, instructions, and/or other data that can be used to control subsequent data uploads 206 from the location-aware systems 232. For example, upload control parameters 212 may include a binary value that is used to enable or disable data uploads 206 for a given geographic region, from one or more location-aware systems 232, from one or more types of location-aware systems 232, for a given type of data, for a given scenario and/or condition under which data was collected, and/or for another set or combination of dimensions associated with data uploads 206. In another example, upload control parameters 212 may include a numeric value representing a "probability" of uploading data associated with a given geographic region, a specific location-aware system 232, a set of location-aware systems 232, a type of location-aware system 232, and/or another set of dimensions. In a third example, upload control parameters 212 may include one or more formulas, rules, heuristics, decision trees, machine learning models, and/or other mechanisms that can be used to control the frequency of data uploads 206, the amount of data included in data uploads 206, types of data included in data uploads 206, and/or other characteristics of data uploads 206 from location-aware systems 232.

Processing engine 124 receives upload control parameters 212 from management engine 122. Processing engine 124 also populates a number of control layers 204(1)-204(Z) (each of which is referred to individually herein as control layer 204) included in map data 220 with upload control parameters 212. For example, processing engine 124 may create one or more new control layers 204 to store one or more new sets of upload control parameters 212 received from management engine 122. Processing engine 124 may also, or instead, replace older upload control parameters 212 in one or more existing control layers 204 with the new upload control parameters 212. Processing engine 124 may also, or instead, delete a given control layer 204 after a time period associated with the corresponding upload control parameters 212 has lapsed.

In one or more embodiments, map data 220 includes geographically indexed data that is divided along spatial boundaries. For example, map data 220 may be divided into discrete map tiles representing contiguous geographic regions within a map. These map tiles may correspond to grid cells, rectangles, squares, hexagons, and/or other shapes or forms. These map tiles may further be defined at multiple "zoom" levels representing different levels of detail. For example, a map tile associated with a low zoom level may represent a relatively large area such as a city, while a map tile associated with a high zoom level may represent a single building or city block.

Map data 220 may also, or instead, include non-polygonal representations of geographic locations and/or regions. For example, map data 220 may include a curve that traverses a map. Each point on the curve may be indexed by a corresponding number and represent a distinct location on the map.

Map data 220 may additionally be organized into multiple layers representing different types of data, such as (but not limited to) images, roads, interstates, road surface markings, traffic signs, radar points, traffic conditions, weather conditions, network conditions, landmarks, topography, and/or metadata. These layers may be transmitted to location-aware systems 232 to allow location-aware systems 232 to provide geolocation, navigation, planning, and/or other types of location-based services or functionality. These layers may also include one or more control layers 204 that can be used to control the operation of location-aware systems 232, including (but not limited to) controlling data uploads 206 of various types of data and/or from various geographic locations by location-aware systems 232.

Processing engine 122 also includes and/or generates schemas 224(1)-224(P) each of which is referred to individually herein as schema 224) for control layers 204 in map data 220. Each schema 224 may define one or more fields in one or more corresponding control layers 204 and how the fields should be used to control data uploads 206.

FIG. 3A illustrates an example schema 224 for a control layer (e.g., control layers 204 of FIG. 2) that is used to control data uploads from a set of location-aware systems, according to various embodiments. As shown in FIG. 3A, the example schema 224 includes two portions 302 and 304. Portion 302 includes a "SSRTriggerCondition" field that is enumerated as a byte data type with three potential values: "None" (which is set to 0), "Partial," and "All." This "SSRTriggerCondition" field thus defines possible trigger conditions for uploading data from a location-aware system.

The "None" value may indicate that no data uploads are to be performed. For example, the "None" value may be set for a given geographic region or location when no data uploads are requested for that geographic region or location and/or when the requested quantity of data uploads for the geographic region or location has already been met.

The "Partial" value may indicate that data uploads are to be performed on a selective or partial basis. For example, the "Partial" value may be set for a given geographic region or location after a certain proportion of the requested quantity of data uploads has been received. The "Partial" value may represent a certain predefined probability of uploading data from the geographic region or location. A location-aware system in the geographic region or location may perform a virtual weighted coin flip using this probability determine whether or not to upload data collected from the geographic region or location. The predefined probability may additionally be adjusted and/or changed based on the proportion of requested data that has been uploaded, the type of data to be uploaded, a specific location-aware system and/or type of location-aware system associated with the data, and/or other factors.

The "All" may indicate that all data is to be uploaded. For example, the "All" value may be set for a given geographic region or location after when a significant quantity of data from the geographic region or location is requested and/or when no data has been uploaded from the geographic region or location.

Portion 304 specifies a table named "SSRControlsV1Layer," which includes a field named "values" that corresponds to an array of "SSRTriggerCondition" values. When map data that includes the control layer is divided into a grid of map tiles, the array may be indexed using the formula [row*grid_size+col], where "row" is a row index for a given map tile in the grid, "col" is a column index for the map tile, and "grid_size" is the number of map tiles along one dimension within the grid. Thus, the "values" field may store different trigger conditions for individual map tiles in the grid.

Portion 304 also includes a field named "zoom_level" that corresponds to a uint8 data type. The "zoom_level" field may represent a zoom level that can be used to derive the "grid_size" and the number of map tiles with distinct "SSRTriggerCondition" values. For example, if the grid includes 21 total zoom levels and "zoom_level" is set to 16 out of 21, "grid_size" may be computed as $2^{(21-16)}=32$, and the "values" array may include 32×32=1024 distinct "SSRTriggerCondition" values for 1024 different map tiles at zoom level 16.

FIG. 3B illustrates an example schema 224 for a control layer (e.g., control layers 204 of FIG. 2) that is used to control data uploads from a set of location-aware systems, according to various embodiments. As shown in FIG. 3B, the example schema 224 includes a portion 306 that defines a "MapStreamControlsV1Layer" table with two fields. The first field is named "pvalues" and corresponds to an array of uint8 values. As with the "values" array of FIG. 3A, when map data that includes the control layer is divided into a grid of map tiles, the "pvalues" array may be indexed using the formula [row*grid_size+col], where "row" is a row index for a given map tile in the grid, "col" is a column index for the map tile, and "grid_size" is the number of map tiles along one dimension within the grid. Thus, the "pvalues" field may store different values that are used to control data uploads from individual map tiles in the grid.

Each element of the "pvalues" array may include an integer ranging from 0 to 255. A value of 255 indicates that no data is to be uploaded from a corresponding geographic region or location. A value of 0 indicates that all data is to be uploaded from a corresponding geographic region or location. Values in between 0 and 255 represent a probability of uploading data from a corresponding geographic region or location, with lower values indicating a higher probability. For example, a probability of uploading data from the geographic region or location may be computed using the formula [1−pvalue/255], where "pvalue" is an element from the "pvalues" array that corresponds to the geographic region or location. A location-aware system may use this probability to perform a virtual weighted coin flip that determines whether or not to upload data collected from the geographic region or location. Each element in the "pvalues" array may additionally be updated based on the proportion of requested data that has been uploaded from the geographic region or location, the type of data to be uploaded from the geographic region or location, a specific location-aware system and/or type of location-aware system associated with the data, and/or other factors.

The second field in the MapStreamControlsV1Layer" table is named "zoom level" and corresponds to a uint8 data type. The "zoom_level" field may represent a zoom level that can be used to derive the "grid_size" and the number of distinct values in the "pvalues" array. For example, if the grid includes 21 zoom levels and "zoom_level" is set to 16 out of 21, "grid_size" may be computed as 2^(21−16)=32, and the "pvalues" array may include 32×32=1024 distinct probability values for 1024 different map tiles at zoom level 16.

Returning to the discussion of FIG. 2, processing engine 122 transmits control layers 204 and/or the corresponding schemas 224 to location-aware systems 232 to control data uploads 206 by location-aware systems 232. In some embodiments, a given location-aware system 232 retrieves a portion of map data 220 (e.g., one or more control layers 204, map tiles, etc.) and/or a corresponding schema 224 by transmitting a request specifying the portion of map data 220 and/or schema 224 to processing engine 124. Processing engine 124 processes the request by matching parameters of the request to the portion of map data 220 and/or schema 224 and transmitting a response that includes the portion of map data 220 and/or schema 224 to that location-aware system 232.

For example, processing engine 122 may receive, from a given location-aware system 232, a request that specifies a set of coordinates, a map tile, and/or another representation of a geographic location and/or geographic region. The request may also, or instead, include an identifier for that location-aware system 232, an identifier for a group of location-aware systems 232 to which that location-aware system 232 belongs, and/or a type of that location-aware system 232. The request may also, or instead, specify a type of data, a certain data collection campaign 218, and/or a certain control layer 204 within map data 220. Processing engine 122 may perform a lookup of map data 220 by the parameters included in the request and retrieve one or more map tiles and/or one or more control layers 204 within the map tile(s) that match the parameters. Processing engine 122 may then transmit, to that location-aware system 232, a response that includes the map tile(s) and/or control layer(s) 204. Processing engine 122 may optionally transmit, in the same response, a corresponding schema 224 for the map tile(s) and/or control layer(s) 204 (e.g., if data in the map tile(s) and/or control layer(s) 204 is associated with a new schema 224 that has not been previously used by that location-aware system 232). Processing engine 122 may alternatively transmit the corresponding schema 224 in response to receiving a separate request that specifies that schema 224.

In one or more embodiments, location-aware systems 232 transmit requests for control layers 204 in map data 220 and/or the corresponding schemas 224 to processing engine 124 upon detecting changes to these control layers 204 and/or schemas 224. For example, a given location-aware system 232 may periodically and/or continuously query processing engine 124 for, and/or receive from processing engine 124, a checksum, timestamp, and/or another representation of the latest and/or most up-to-date set of control layers 204 for a geographic location and/or geographic region of interest (e.g., the current geographic location and/or region of that location-aware system 232, a projected future geographic location and/or region of location-aware system 232, etc.). When the representation indicates that that location-aware system 232 does not have the latest and/or most up-to-date set of control layers 204, that location-aware system 232 may request the most up-to-date control layers 204 (and optionally the corresponding schema(s) 224) for the geographic location and/or geographic region from processing engine 124. In this manner, location-aware systems 232 may perform data uploads 206 using the latest upload control parameters 212, control layers 204, and/or schemas 224 without requiring changes to the software at location-aware systems 232 and/or frequent communication between processing engine 124 and location-aware systems 232.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

Figure 4:
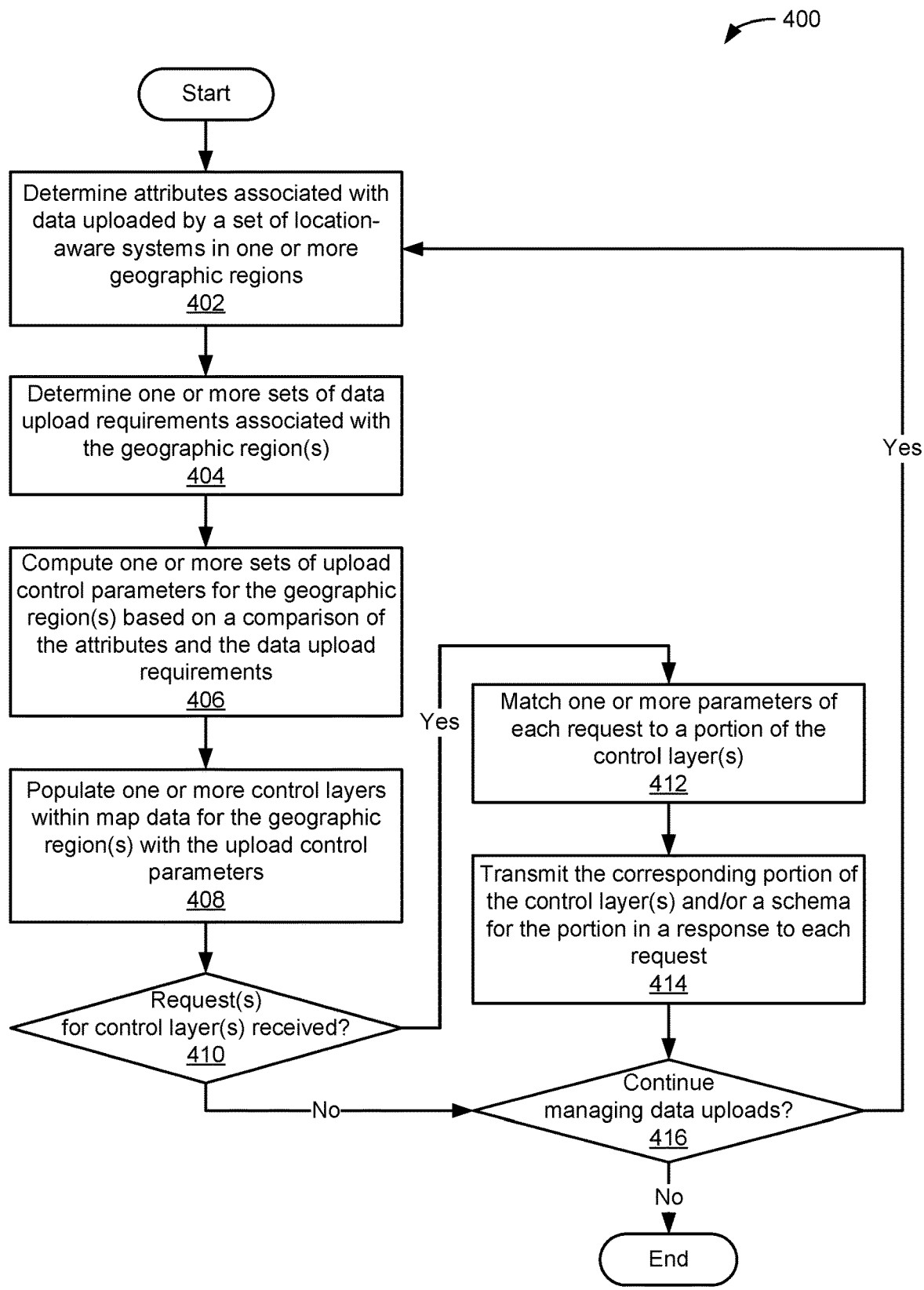
FIG. 4 illustrates a flow diagram of a method for managing data transmission in a set of location-aware systems, according to various embodiments.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the system of FIG. 1. However, these methods may additionally or alternatively be executed by any one system, or any combination of systems, including, but not limited to, those described herein.

FIG. 4 illustrates a flow diagram of a method 400 for managing data transmission in a set of location-aware systems, according to various embodiments. As shown in FIG. 4, method 400 begins with operation 402, in which management engine 122 determines attributes associated with data uploaded by a set of location-aware systems in one or more geographic regions. For example, management engine 122 may receive, from a distributed messaging system, events representing data uploads by the location-aware systems. Management engine 122 may compute a different set of attributes for each data upload, a set of data uploads from a given location-aware system and/or set of location-aware systems, a set of data uploads received over a given time period, a set of data uploads associated with a geographic region, and/or another selection or aggregation of data uploads. The attributes may include (but are not limited to) the number of data uploads from a given geographic region, from one or more location-aware systems, and/or over a certain time period; an amount of data included in data uploads from a given geographic region, from one or more location-aware systems, and/or over a certain time period; one or more types of data (e.g., images, point clouds, road conditions, traffic patterns, weather conditions, lane geometries, traffic signs, traffic rules, etc.) included in data uploads from a given geographic region, from one or more location-aware systems, and/or over a certain time period; and/or one or more characteristics of data included in data uploads from a given geographic region, from one or more location-aware systems, and/or over a certain time period.

In operation 404, management engine 122 determines one or more sets of data upload requirements associated with the geographic region(s). Each set of data upload requirements 202 may specify a given geographic region, a specific location-aware system (e.g., a unique identifier for a vehicle), a type of location-aware system (e.g., a category of location-aware system, one or more hardware and/or software components included in one or more location-aware systems, a model of location-aware system, a company and/or entity associated with manufacturing or operating one or more location-aware systems, etc.), a type of data included in data uploads (e.g., sensor data, telemetry data, images, weather conditions, road conditions, traffic conditions, log data, synthetic/simulated data, real-world data, etc.), a characteristic of data included in data uploads (e.g., objects depicted in images, certain weather or road conditions, etc.), a time period over which data uploads are to be collected, and/or another dimension associated with the data uploads. Each set of data upload requirements may also include (but is not limited to) a minimum, maximum, and/or desired number of data uploads associated with a given set of dimensions; a minimum, maximum, and/or desired amount of data to be included in data uploads associated with a given set of dimensions; and/or other value that can be used to control data uploads associated with a given set of dimensions.

In operation 406, management engine 122 computes one or more sets of upload control parameters for the geographic region(s) based on a comparison of the attributes and the data upload requirements. For example, management engine 122 may obtain a counter for a number of data uploads to be collected from a given geographic region from data upload requirements for the geographic region. Management engine 122 may decrement this counter by a field in the attributes that specifies the number of data uploads associated with the geographic region. Management engine 122 may then compute a probability and/or another value that is used to control the rate and/or likelihood of subsequent data uploads associated with the geographic region based on the counter.

In operation 408, processing engine 124 populates one or more control layers within map data for the geographic region(s) with the upload control parameters. For example, processing engine 124 may store, within the control layer(s), a probability, one or more rules, and/or other values used to control the rate and/or likelihood of subsequent data uploads associated with each geographic region in an array element and/or another field associated with the geographic region. Processing engine 124 may also specify a specific location-aware system, a set of location-aware systems, a type of location-aware system, a time period, a type of data, a characteristic of data, and/or other dimensions to which the control layer pertains.

In operation 410, processing engine 124 determines whether or not one or more requests for one or more control layer(s) have been received from one or more location-aware systems. For example, a given location-aware system may transmit the request on a periodic basis and/or upon detecting a change to a control layer that is relevant to the location-aware system, data collected by the location-aware system, and/or a current or future location of the location-aware system. The request may include parameters that specify a particular geographic region, an identifier for the location-aware system, a type of location-aware system, a group of location-aware systems to which the location-aware system belongs, a type of data that can be uploaded, a characteristic of data that can be uploaded, a time period over which data uploads are to be collected, and/or another dimension associated with data uploads by the location-aware system. If processing engine 124 determines that no requests for control layers have been received, processing engine 124 does not transmit any control layers to location-aware systems.

If processing engine 124 determines that one or more requests for control layers have been received, processing engine 124 performs operation 412, in which processing engine 124 matches one or more parameters of each request to a portion of the control layer(s). For example, processing engine 124 may perform a lookup of the map data by a geographic region, an identifier for the location-aware system, a type of location-aware system, a group of location-aware systems to which the location-aware system belongs, a type of data that can be uploaded, a characteristic of data that can be uploaded, a time period over which data uploads are to be collected, and/or another dimension specified in each request.

In operation 414, processing engine 124 transmits the corresponding portion of the control layer(s) and/or a schema for the portion in a response to each request. For example, processing engine 124 may transmit one or more control layers that store probabilities, binary values, and/or other fields that can be used to control data uploads to each location-aware system from which a request was received. Processing engine 124 may also transmit a schema for the field(s) and/or control layer(s) with the portion if the schema was requested by the corresponding location-aware system, if the schema for the portion is new and/or has changed, and/or based on other factors or conditions.

In operation 416, management engine 124 and/or processing engine 124 determine whether or not to continue managing data uploads. For example, management engine 124 and/or processing engine 124 may determine that managing of data uploads is to continue while data is being uploaded by the location-aware systems and/or while data collection campaigns for the data uploads are in place.

While data uploads continue to be managed, management engine 122 and processing engine 124 repeat operations 402, 404, 406, 408, 410, 412, 414, and 416 on a periodic and/or continuous basis. For example, management engine 122 may perform operations 402, 404, and 406 to generate up-to-date attributes, upload requirements, and upload control parameters for data upload from the location-aware systems. Processing engine 124 may then perform operations 408, 410, 412, and/or 414 to provide the latest upload control parameters to the location-aware systems. Management engine 122 and processing engine 124 may continue using method 400 to manage data uploads from the location-aware systems until data uploads are no longer performed by the location-aware systems, data collection campaigns are no longer used to control and/or prioritize data uploads by the location-aware systems, and/or until one or more other conditions are met.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 5A:
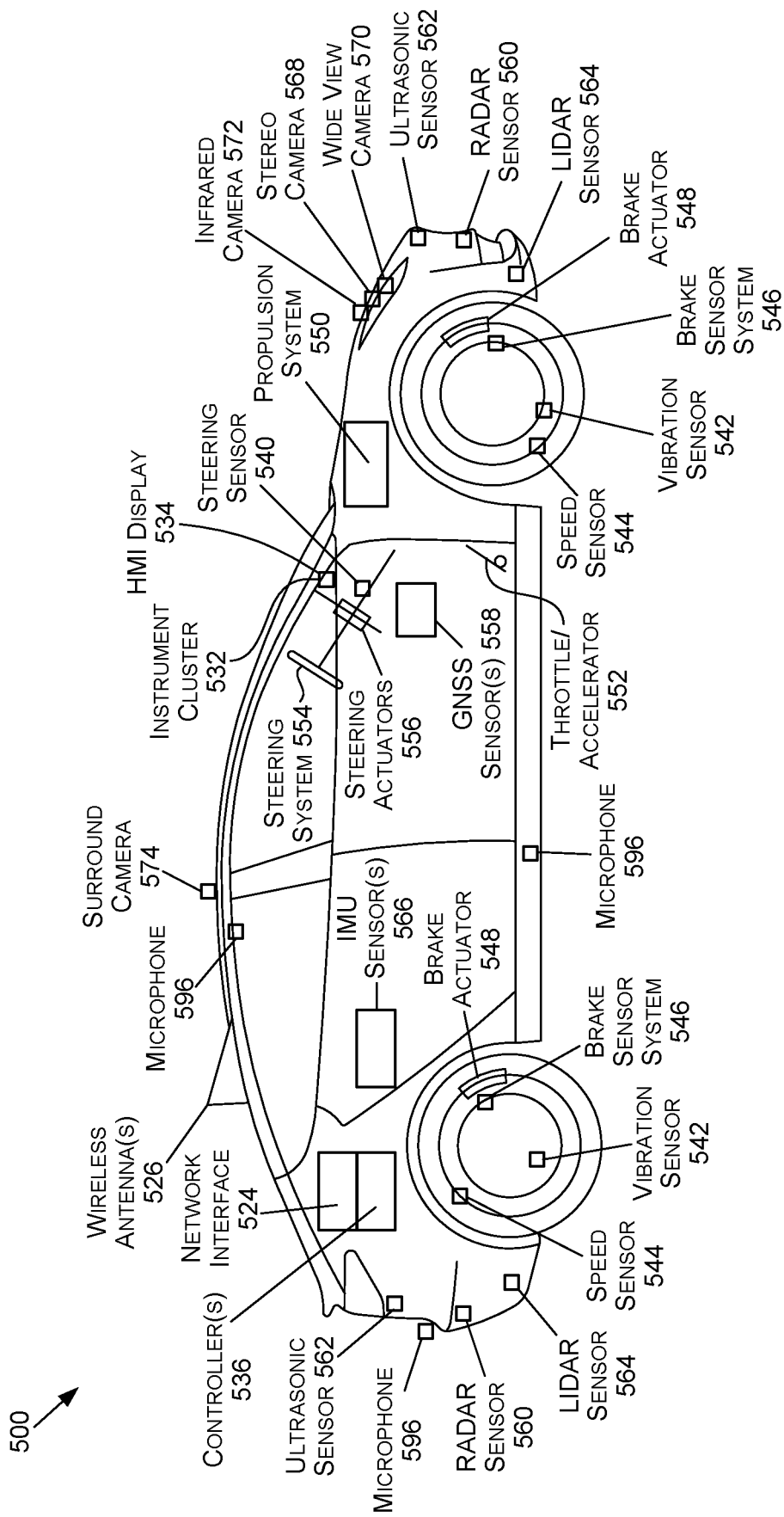
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
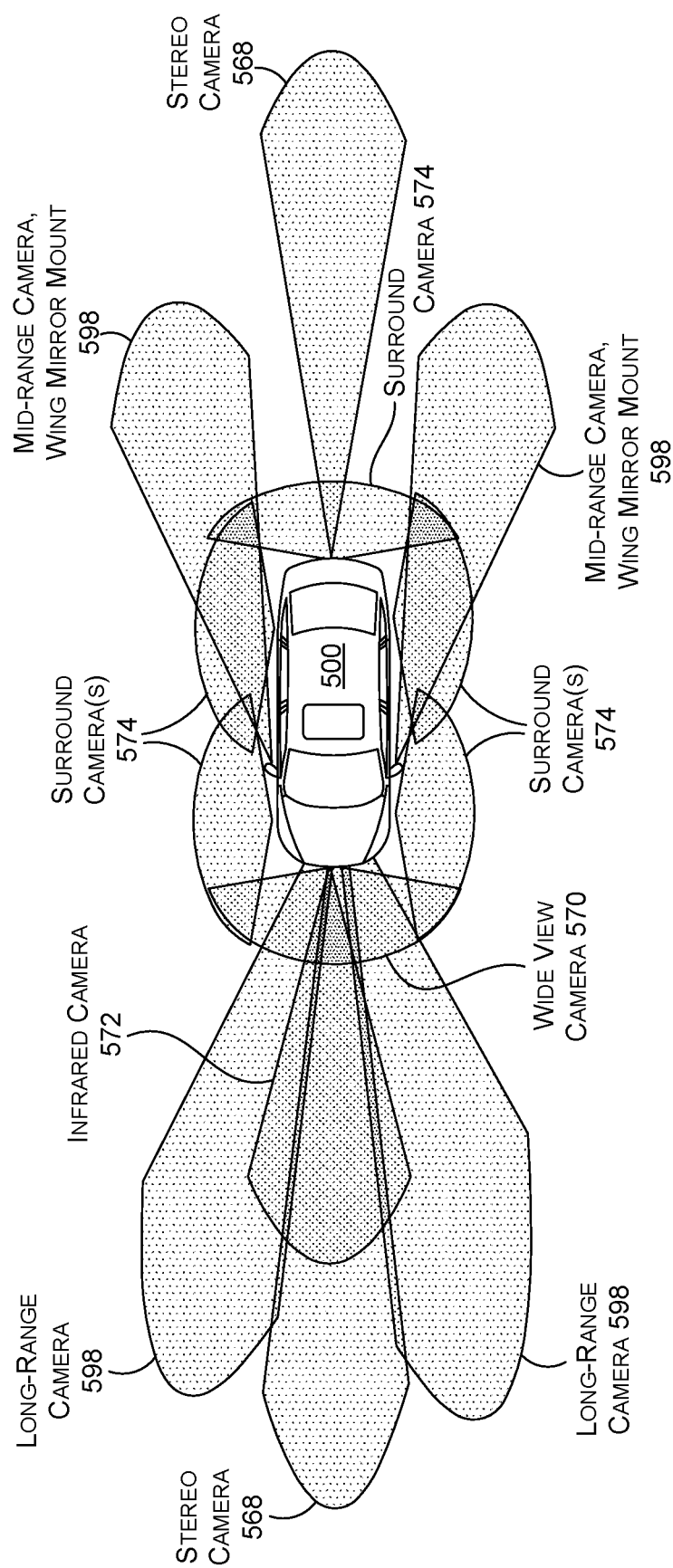
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
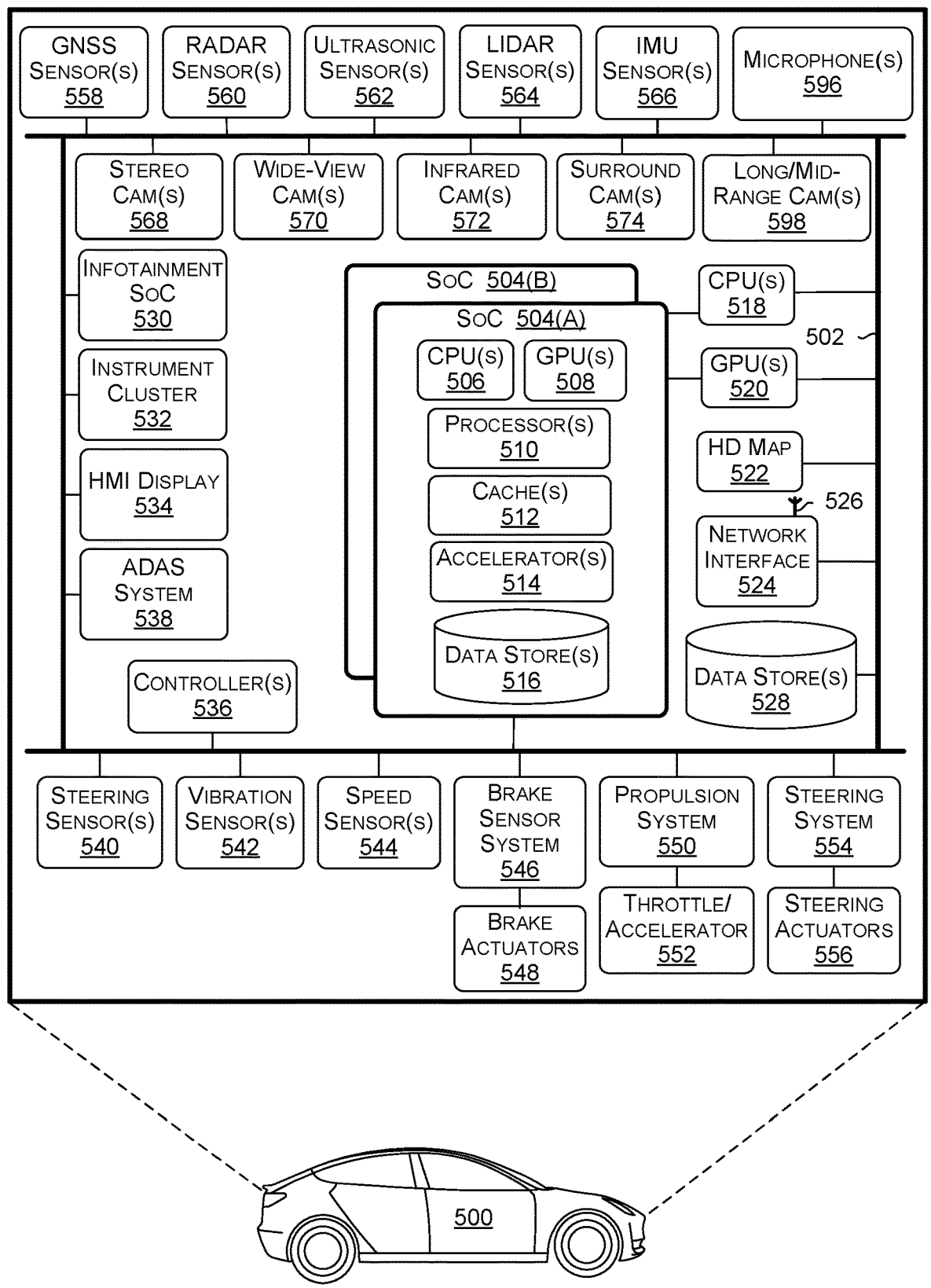
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming micro-processor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks. The SoC(s) 504 may also determine whether or not to upload data from various sources based on one or more control layers within map data received from a remote location, as discussed above with respect to FIGS. 1-4.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects.

Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
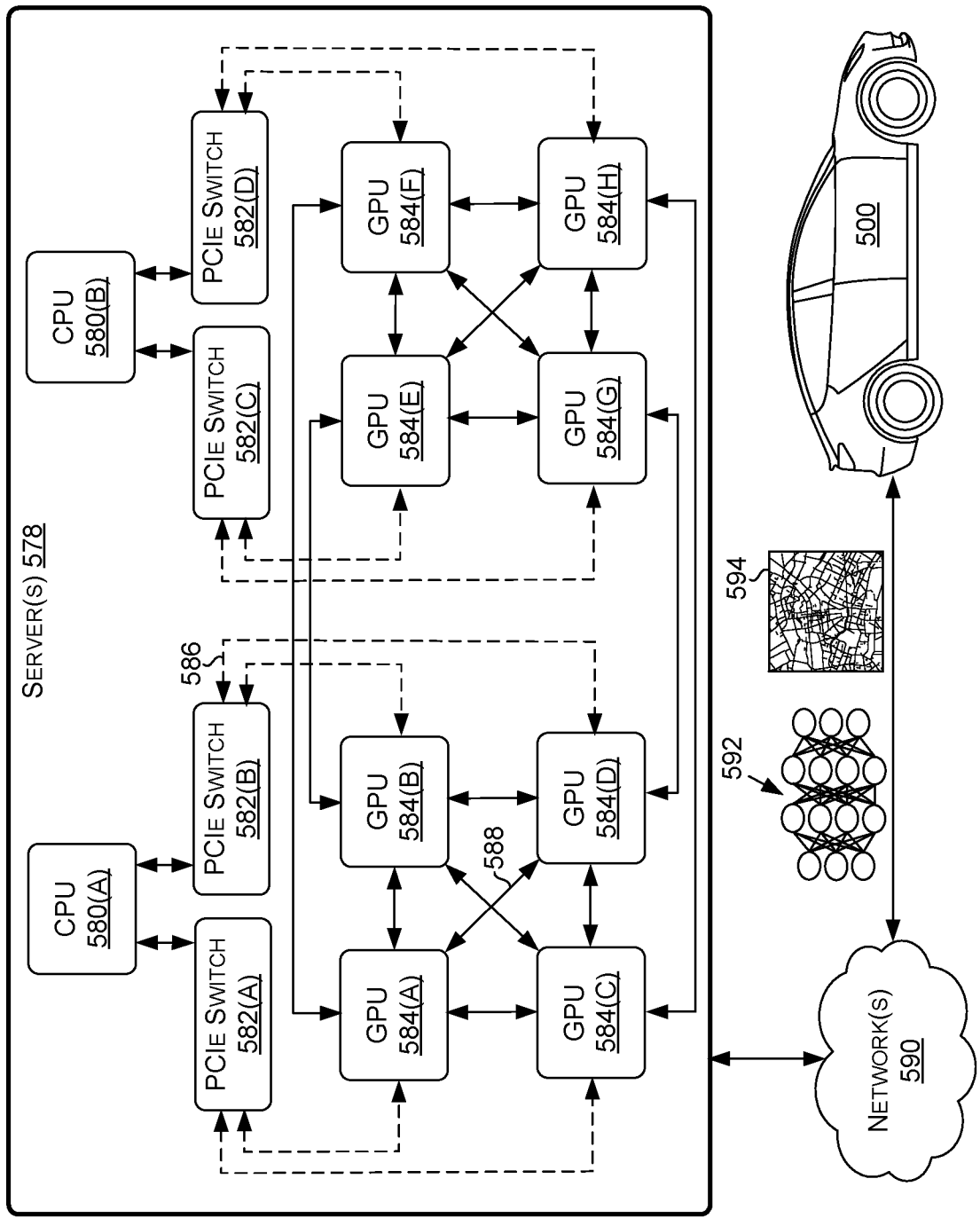
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAS, and other processors may be used for inferencing.

Example Computing Device

Figure 6:
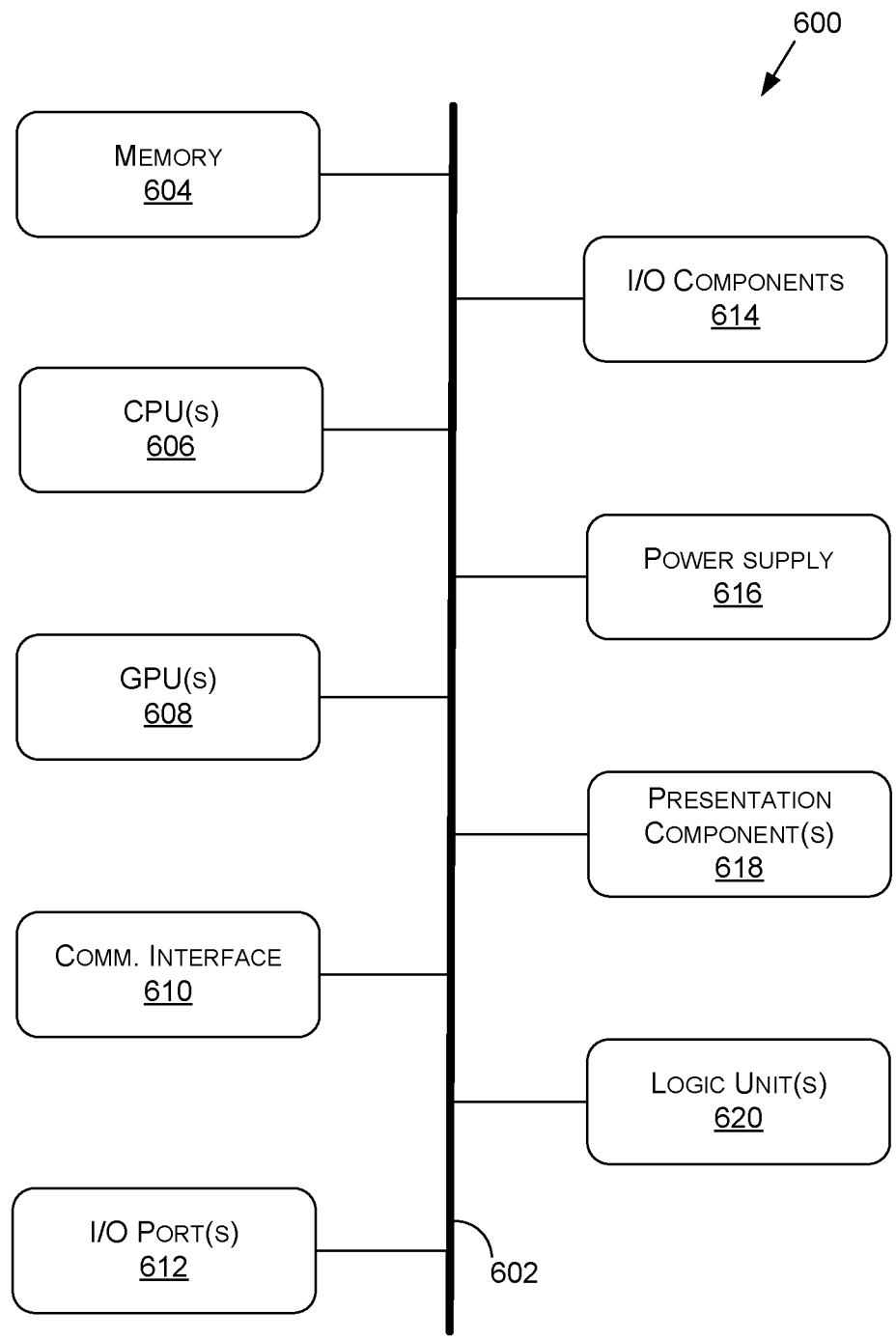
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608. As discussed above with respect to FIGS. 1-4, this data may be selectively transmitted based on probabilities and/or other values included in control layers of map data transmitted to the computing device 600.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
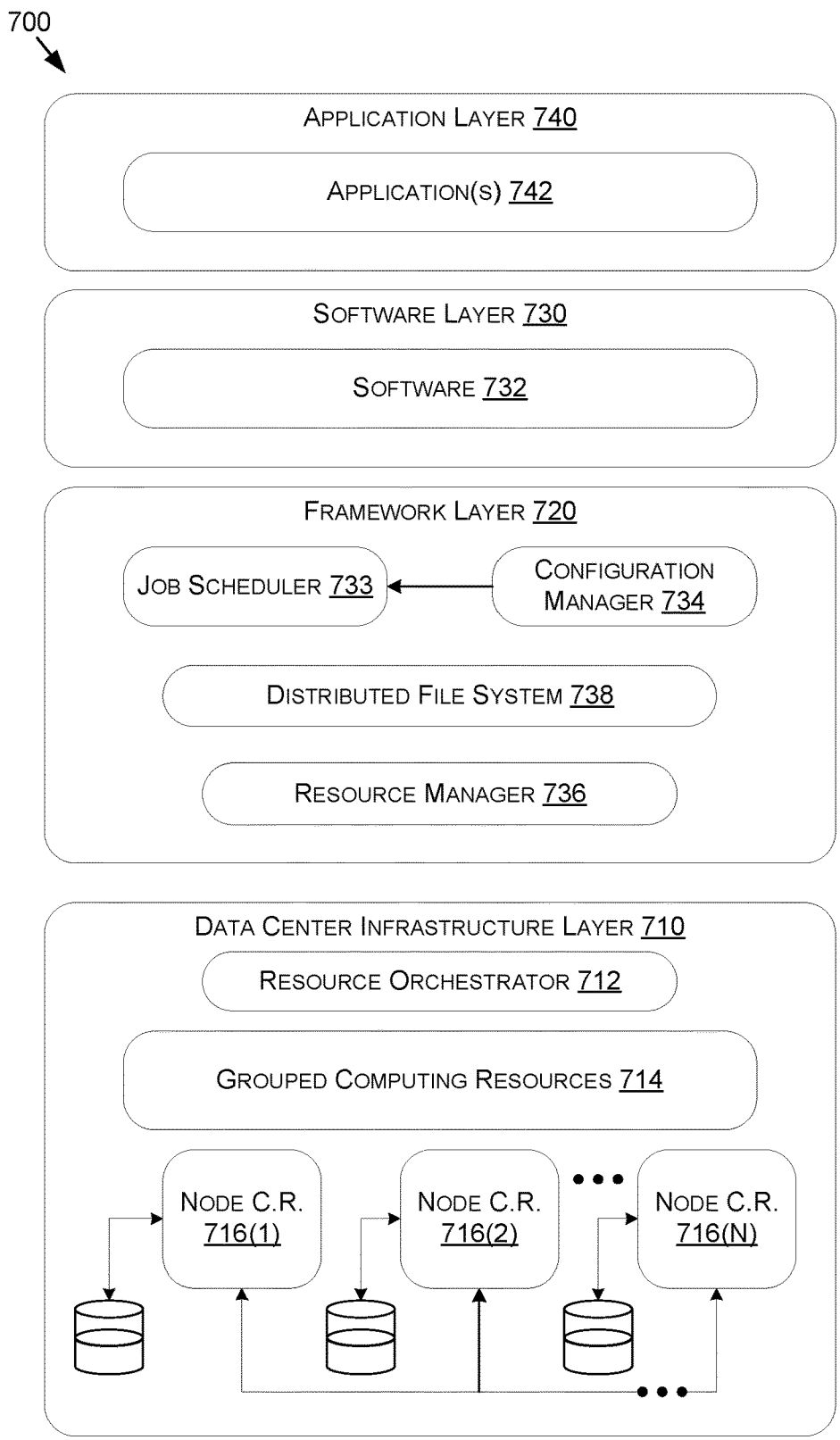
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

The data center 700 may include tools, services, software or other resources to implement one or more instances of tracking engine 126, management engine 122, and processing engine 124. These instance(s) may be used to manage data uploads from location-aware systems to the data center 700, as discussed above with respect to FIGS. 1-4.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques provide guidance related to uploading data from vehicles in a fleet (or other types of location-aware systems) via a set of geospatially indexed control layers. A vehicle may request one or more control layers from a server and/or a centralized distribution system and selectively upload data according to information in the control layer(s). Each control layer may specify, for a given geographic region, the types of data that can be uploaded, the amount of data to be uploaded, the frequency with which the data is to be uploaded, the number of times the data should be uploaded, situations in which data should be uploaded or not uploaded, times at which the data should be uploaded or not uploaded, probabilities or priorities associated with uploading these types of data, settings for enabling or disabling the upload of data, and/or other parameters that can be used to control the upload of data from that geographic region. A given control layer may be added, removed, and/or updated in real-time or near-real-time to reflect new use cases and/or changes to existing use cases associated with the uploaded data, the types and amount of data that has already been uploaded for the geographic region, and/or other factors. A given control layer may also be distributed with a schema that allows a vehicle to interpret and adapt data uploads to parameters in the control layer.

One technical advantage of the disclosed techniques relative to prior approaches is the ability to specify and implement various policies for controlling the upload of data from a fleet of vehicles, thereby allowing limited bandwidth allocated to these uploads to be utilized in an efficient, effective, and responsive manner. Additionally, the disclosed techniques allow portions of control layers for controlling data uploads to be selectively requested by the vehicles, which reduces communication with the vehicles and resource overhead associated with an online infrastructure for conducting this communication. Further, because schemas for the control layers are distributed with the control layers, the vehicles are able to adapt data uploads to parameters in the control layers without requiring custom code, retry mechanisms, redundancies, databases, and/or caching layers to be created and propagated.

1. In some embodiments, a method comprises determining a set of attributes associated with a set of data uploaded using a set of location-aware systems in a geographic region; computing a set of upload control parameters for the geographic region based at least on the set of attributes; receiving, from a location-aware system, a request indicating the geographic region; and sending, to the location-aware system in response to the request, the set of upload control parameters within one or more control layers included in map data for the geographic region, wherein the location-aware system controls upload of additional data associated with the geographic region based at least on the one or more control layers.

2. The method of clause 1, further comprising determining a second set of attributes associated with a second set of data uploaded using a second set of location-aware systems in a second geographic region; generating a second set of upload control parameters for the second geographic region based at least on the second set of attributes; and sending the second set of upload control parameters within the one or more control layers in response to a second request indicating the second geographic region.

3. The method of any of clauses 1-2, further comprising sending a schema associated with the set of upload control parameters to the location-aware system.

4. The method of any of clauses 1-3, wherein the computing the set of upload control parameters comprises determining a set of data upload requirements associated with the geographic region; and generating the set of upload control parameters based at least on a comparison of the set of attributes and the set of data upload requirements.

5. The method of any of clauses 1-4, wherein the determining the set of data upload requirements comprises matching the geographic region to one or more data collection campaigns; and aggregating the set of data upload requirements from the one or more data collection campaigns.

6. The method of any of clauses 1-5, wherein the one or more data collection campaigns comprise a time period over which data is to be collected from the geographic region.

7. The method of any of clauses 1-6, wherein the set of attributes comprises at least one of a number of uploads, a size of the set of data, one or more types of data included in the set of data, or one or more characteristics of the set of data.

8. The method of any of clauses 1-7, wherein the set of upload control parameters comprises at least one of a probability of upload, a type of data to upload, an amount of data to upload, a set of conditions that trigger a data upload, or a set of conditions that trigger disabling of a data upload.

9. The method of any of clauses 1-8, wherein the geographic region is indicated in the request using at least one of a set of coordinates, a map tile, a zoom level associated with a map tile, a point on a curve, a cell in a grid, or a geofence.

10. The method of any of clauses 1-9, wherein the set of location-aware systems comprises at least one of a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system for performing one or more generative AI operations; a system implementing one or more large language models (LLMs); a system for generating synthetic data; a system incorporating one or more virtual machines (VMs); a system implemented at least partially in a data center; or a system implemented at least partially using cloud computing resources.

11. In some embodiments, one or more processors comprise one or more circuits to perform operations comprises determining a set of attributes associated with a set of data uploaded using a set of location-aware systems in a geographic region; computing a set of upload control parameters for the geographic region based at least on the set of attributes; receiving, from a location-aware system, a request indicating the geographic region; and sending, to the location-aware system in response to the request, the set of upload control parameters within one or more control layers included in map data for the geographic region, wherein the location-aware system controls upload of additional data associated with the geographic region based at least on the one or more control layers.

12. The one or more processors of clause 11, wherein the operations further comprise determining a second set of attributes associated with a second set of data uploaded using a second set of location-aware systems in a second geographic region; generating a second set of upload control parameters for the second geographic region based at least on the second set of attributes; and sending the second set of upload control parameters within the one or more control layers in response to a second request indicating the second geographic region.

13. The one or more processors of any of clauses 11-12, wherein the operations further comprise sending a schema associated with the one or more control layers to the location-aware system.

14. The one or more processors of any of clauses 11-13, wherein the one or more control layers comprise a first control layer that includes a first subset of the set of upload control parameters and a second control layer that includes a second subset of the set of upload control parameters.

15. The one or more processors of any of clauses 11-14, wherein the computing the set of upload control parameters comprises computing a probability of upload included in the set of upload control parameters based at least on a comparison of a number of data uploads associated with the set of data and a number of requested uploads associated with the geographic region. 16.

16. The one or more processors of any of clauses 11-15, wherein the set of data comprises at least one of sensor data, log data, telemetry data, simulated data, or development data.

17. The one or more processors of any of clauses 11-16, wherein the set of upload control parameters is computed based at least on at least one of receiving one or more new uploads associated with the geographic region or a frequency associated with updating the set of upload control parameters.

18. The one or more processors of any of clauses 11-17, wherein the one or more processors is comprised in at least one of a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system for performing one or more generative AI operations; a system implementing one or more large language models (LLMs); a system for generating synthetic data; a system incorporating one or more virtual machines (VMs); a system implemented at least partially in a data center; or a system implemented at least partially using cloud computing resources.

19. In some embodiments, a system comprises one or more processors to perform operations comprising computing a set of upload control parameters for a geographic region based at least on a set of attributes associated with a set of data uploaded using a set of location-aware systems in a geographic region; sending, to a location-aware system and in response to a request indicating the geographic region from the location-aware system, the set of upload control parameters within one or more control layers included in map data for the geographic region, wherein the location-aware system controls upload of additional data associated with the geographic region based at least on the one or more control layers.

20. The system of clause 19, wherein the system is comprised in at least one of a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system for performing one or more generative AI operations; a system implementing one or more large language models (LLMs); a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining a set of attributes associated with a set of data uploaded using a set of location-aware systems in a geographic region;
   computing a set of upload control parameters for the geographic region based at least on the set of attributes;
   receiving, from a location-aware system, a request indicating the geographic region; and
   sending, to the location-aware system in response to the request, the set of upload control parameters within one or more control layers included in map data for the geographic region,
   wherein the location-aware system controls upload of additional data associated with the geographic region based at least on the one or more control layers.

2. The method of claim 1, further comprising:
   determining a second set of attributes associated with a second set of data uploaded using a second set of location-aware systems in a second geographic region;
   generating a second set of upload control parameters for the second geographic region based at least on the second set of attributes; and
   sending the second set of upload control parameters within the one or more control layers in response to a second request indicating the second geographic region.

3. The method of claim 1, further comprising sending a schema associated with the set of upload control parameters to the location-aware system.

4. The method of claim 1, wherein the computing the set of upload control parameters comprises:
   determining a set of data upload requirements associated with the geographic region; and
   generating the set of upload control parameters based at least on a comparison of the set of attributes and the set of data upload requirements.

5. The method of claim 4, wherein the determining the set of data upload requirements comprises:
   matching the geographic region to one or more data collection campaigns; and
   aggregating the set of data upload requirements from the one or more data collection campaigns.

6. The method of claim 5, wherein the one or more data collection campaigns comprise a time period over which data is to be collected from the geographic region.

7. The method of claim 1, wherein the set of attributes comprises at least one of a number of uploads, a size of the set of data, one or more types of data included in the set of data, or one or more characteristics of the set of data.

8. The method of claim 1, wherein the set of upload control parameters comprises at least one of a probability of upload, a type of data to upload, an amount of data to upload, a set of conditions that trigger a data upload, or a set of conditions that trigger disabling of a data upload.

9. The method of claim 1, wherein the geographic region is indicated in the request using at least one of a set of coordinates, a map tile, a zoom level associated with a map tile, a point on a curve, a cell in a grid, or a geofence.

10. The method of claim 1, wherein the set of location-aware systems comprises at least one of:
   a control system for an autonomous or semi-autonomous machine;
   a perception system for an autonomous or semi-autonomous machine;
   a system for performing one or more simulation operations;
   a system for performing one or more digital twin operations;
   a system for performing light transport simulation;
   a system for performing collaborative content creation for 3D assets;
   a system for performing one or more deep learning operations;
   a system implemented using an edge device;

a system for generating or presenting at least one of virtual reality content, augmented reality content, or mixed reality content;
a system implemented using a robot;
a system for performing one or more conversational AI operations;
a system for performing one or more generative AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

11. One or more processors comprising:
one or more circuits to perform operations comprising:
determining a set of attributes associated with a set of data uploaded using a set of location-aware systems in a geographic region;
computing a set of upload control parameters for the geographic region based at least on the set of attributes;
receiving, from a location-aware system, a request indicating the geographic region; and
sending, to the location-aware system in response to the request, the set of upload control parameters within one or more control layers included in map data for the geographic region,
wherein the location-aware system controls upload of additional data associated with the geographic region based at least on the one or more control layers.

12. The one or more processors of claim 11, wherein the operations further comprise:
determining a second set of attributes associated with a second set of data uploaded using a second set of location-aware systems in a second geographic region;
generating a second set of upload control parameters for the second geographic region based at least on the second set of attributes; and
sending the second set of upload control parameters within the one or more control layers in response to a second request indicating the second geographic region.

13. The one or more processors of claim 11, wherein the operations further comprise sending a schema associated with the one or more control layers to the location-aware system.

14. The one or more processors of claim 11, wherein the one or more control layers comprise a first control layer that includes a first subset of the set of upload control parameters and a second control layer that includes a second subset of the set of upload control parameters.

15. The one or more processors of claim 11, wherein computing the set of upload control parameters comprises computing a probability of upload included in the set of upload control parameters based at least on a comparison of a number of data uploads associated with the set of data and a number of requested uploads associated with the geographic region.

16. The one or more processors of claim 11, wherein the set of data comprises at least one of sensor data, log data, telemetry data, simulated data, or development data.

17. The one or more processors of claim 11, wherein the set of upload control parameters is computed based at least on at least one of receiving one or more new uploads associated with the geographic region or a frequency associated with updating the set of upload control parameters.

18. The one or more processors of claim 11, wherein the one or more processors is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system for generating or presenting at least one of virtual reality content, augmented reality content, or mixed reality content;
a system implemented using a robot;
a system for performing one or more conversational AI operations;
a system for performing one or more generative AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

19. A system comprising:
one or more processors to perform operations comprising:
computing a set of upload control parameters for a geographic region based at least on a set of attributes associated with a set of data uploaded using a set of location-aware systems in a geographic region;
sending, to a location-aware system and in response to a request indicating the geographic region from the location-aware system, the set of upload control parameters within one or more control layers included in map data for the geographic region,
wherein the location-aware system controls upload of additional data associated with the geographic region based at least on the one or more control layers.

20. The system of claim 19, wherein the system is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system for generating or presenting at least one of virtual reality content, augmented reality content, or mixed reality content;

a system implemented using a robot;
a system for performing one or more conversational AI operations;
a system for performing one or more generative AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

* * * * *